United States Patent
Chakravarty et al.

(10) Patent No.: US 7,614,007 B2
(45) Date of Patent: Nov. 3, 2009

(54) EXECUTING MULTIPLE FILE MANAGEMENT OPERATIONS

(75) Inventors: Vijaylaxmi Chakravarty, Austin, TX (US); Oltea Mihaela Herescu, Austin, TX (US); Claudia Andrea Salzberg, Austin, TX (US); Robert Lee Snider, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/759,932

(22) Filed: Jan. 16, 2004

(65) Prior Publication Data

US 2005/0160373 A1    Jul. 21, 2005

(51) Int. Cl.
*G06F 3/048*    (2006.01)
(52) U.S. Cl. .................. 715/772; 715/808; 715/809; 715/837; 715/769; 715/770
(58) Field of Classification Search .................. 715/700, 715/769, 772, 770, 808, 809, 817, 837
See application file for complete search history.

(56) References Cited

U.S. PATENT DOCUMENTS

| | | | | |
|---|---|---|---|---|
| 4,984,152 | A * | 1/1991 | Muller | 715/856 |
| 5,341,293 | A * | 8/1994 | Vertelney et al. | 715/236 |
| 5,408,599 | A * | 4/1995 | Nomura et al. | 715/273 |
| 5,488,720 | A | 1/1996 | Inui et al. | |
| 5,561,758 | A * | 10/1996 | Hocker et al. | 715/835 |
| 5,892,948 | A * | 4/1999 | Aoki et al. | 717/105 |
| RE38,865 | E * | 11/2005 | Dumarot et al. | 717/153 |
| 2001/0013877 | A1 * | 8/2001 | Fujino | 345/835 |
| 2001/0044804 | A1 | 11/2001 | Fitzgerald et al. | |
| 2002/0154176 | A1 | 10/2002 | Barksdale et al. | |

(Continued)

FOREIGN PATENT DOCUMENTS

EP    0 288 906 A2    11/1988

(Continued)

OTHER PUBLICATIONS

Robert Cowart, Mastering Windows 95, 1995, Sybex, pp. 241, 510.*

(Continued)

*Primary Examiner*—Steven B Theriault
*Assistant Examiner*—John M Heffington
(74) *Attorney, Agent, or Firm*—Dillon & Yudell LLP

(57) ABSTRACT

A method and device for executing multiple operations on different files displayed on a graphical user interface. A predefined combination of keys is assigned a particular operation, such as "Delete," "Copy," "Move," etc. As a first combination of keys is engaged, one or more files are selected, using a pointing device such as a mouse. The selected files are color-coded, indicating a first operation to be performed on the selected files. A second combination of keys is then engaged, and a second operation is assigned to other selected files. When satisfied that the selected operations are correct for all of the selected files, a user then executes the operations by depressing the "Enter" or similar key. By viewing different operations for different files before the operations are executed, a user is given an overview of all operations to be applied to all selected files, thus improving file management.

18 Claims, 6 Drawing Sheets

U.S. PATENT DOCUMENTS

2003/0074090 A1* 4/2003 Becka et al. .................. 700/83
2004/0114265 A1* 6/2004 Talbert ........................ 360/60

FOREIGN PATENT DOCUMENTS

| GB | 2 363 044 A | 12/2001 |
|---|---|---|
| JP | 64-033616 | 2/1989 |
| JP | 2023438 | 1/1990 |
| JP | 2093961 | 4/1990 |
| JP | 11-272403 | 10/1999 |
| JP | 2002007180 | 1/2002 |
| JP | 2003-58303 | 2/2003 |

OTHER PUBLICATIONS

PowerQuest, PartitionMagic User Guide, Sep. 2002, PowerQuest, 4, 14, 15, 19.*
Man pages section 3: Threads and Realtime Library Functions, 2004, Sun Microsystems Inc. Part No. 817-3944-10, pp. 75-78.*
S. E. Smith (IBM TDB), Mutli-state Icon, Mar. 22, 2005, IP.com, Original Discloure Information—TDB n1a 06092 p. 338-339, IP.com No. IPCOM000108582D.*
International Business Machines, Technique for displaying file icon status within the original file icon image in a high color depth environment, Research Disclosure Database No. 429172, Jan. 2000, Research Disclosure Journal Kenneth Mason Publications Ltd.*

* cited by examiner

EXECUTING MULTIPLE FILE MANAGEMENT OPERATIONS

BACKGROUND OF THE INVENTION

1. Technical Field

The present invention relates in general to the field of computers, and in particular to file systems. Still more particularly, the present invention relates to a method and apparatus for concurrently applying multiple operations to different files to a first interim stage, and then executing the operation in a final execution stage.

2. Description of the Related Art

Computer systems often display multiple files in a column or tree format in a graphical user interface (GUI). FIG. 1, for example, illustrates a prior art GUI 100, which includes a listing of file numbers, the dates they were last modified, and their titles. If a particular file is to be manipulated, such as being copied, moved, deleted, etc., then a focus area 102 is applied to a particular file, such as file number "7829." After focus area 102 is applied, the user can then "right click" or "double click" the focus area 102, causing a drop-down or pop-window 104 to appear, giving the user a list of operations that can be applied to the selected file. The user then manipulates a position of a pointer 106 over a particular operation (e.g., "Delete"). When the user "left clicks" the desired operation ("Delete"), typically a warning prompt (not shown) occurs, asking the user if she is certain that she wants to perform the operation. If the user clicks a "Yes" button, then the operation immediately occurs, often irreversibly.

A method and system as illustrated in FIG. 1 has several disadvantages. First, the user can only perform one function at a time. That is, while multiple files can be selected, typically by holding down the "Control" or "Shift" key while focusing on multiple files, only one function can then be applied to all of the selected files.

A second disadvantage is that there is no ability to assign groups of multiples files to different categories. Specifically, the prior art requires the user to apply multiple objects (files) to a single category of functions (operation such as "Delete"), but does not allow the user to apply multiple categories to different objects. Thus, all highlighted files in the prior art GUI 100 will have the same function applied to them.

A third disadvantage is that once an action has been selected, the action is often irreversible. For example, once the user clicks on the "Delete" command for the selected files, the operation, after a prompt, becomes final, unless the user can access a "Trash" file or similar file storage. Other operations, such as "Move" or "Rename," are irreversible, with no recourse available to "undo" the operation.

A fourth disadvantage is that the GUI displayed functions taught prior art typically do not "remember" operations from a prior active window. For example, assume that files "0037," "0187," and "7829" shown displayed in FIG. 1 are the files in "Sub1," which is a sub-root of the main file labeled "Main." If focus is applied to "Sub2," then the files in "Sub2" will be displayed (not shown), but the focus on file "7829" is immediately lost. Therefore, if files from different sub-roots are chosen for an operation, such as being deleted, then the files in each sub-root must be selected and deleted before processing files in the next sub-root.

The functions described therefore do not allow the user to categorize the files into different groups according to what function is to be applied, and then to view and obtain an overview of what actions are to be taken on all files. That is, in FIG. 1 the prior art would not permit the preliminary interim selection of file "0037" for deletion, while concurrently selecting file "0187" to be copied and file "7829" to be sent to another location, such as an e-mail address. Such a visual representation of all files and what operations the user has planned for the files before actually executing the operations would be useful in organizing the displayed files and the files' ultimate ends.

What is needed, therefore, is a method and system that uses a user to visually characterize multiple files according to different operations to be performed on the files. Preferably, the visual characterizations would remain intact until a final command is issued for concurrent execution all of the selected operations on all of the selected files.

SUMMARY OF THE INVENTION

The present invention is therefore directed to a method and device for executing multiple operations on different files displayed on a graphical user interface. A pre-defined combination of keys is assigned a particular operation, such as "Delete," "Copy," "Move," etc. As a first combination of keys is engaged, one or more files are selected, using a pointing device such as a mouse. The selected files are color-coded, indicating a first operation to be performed on the selected files. A second combination of keys is then engaged, and a second operation is assigned to other selected files. When satisfied that the selected operations are correct for all of the selected files, the user then executes the operations by depressing the "Enter" or similar key. By viewing different operations for different files before the operations are executed, a user is given an overview of all operations to be applied to all selected files, thus providing improved file management.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
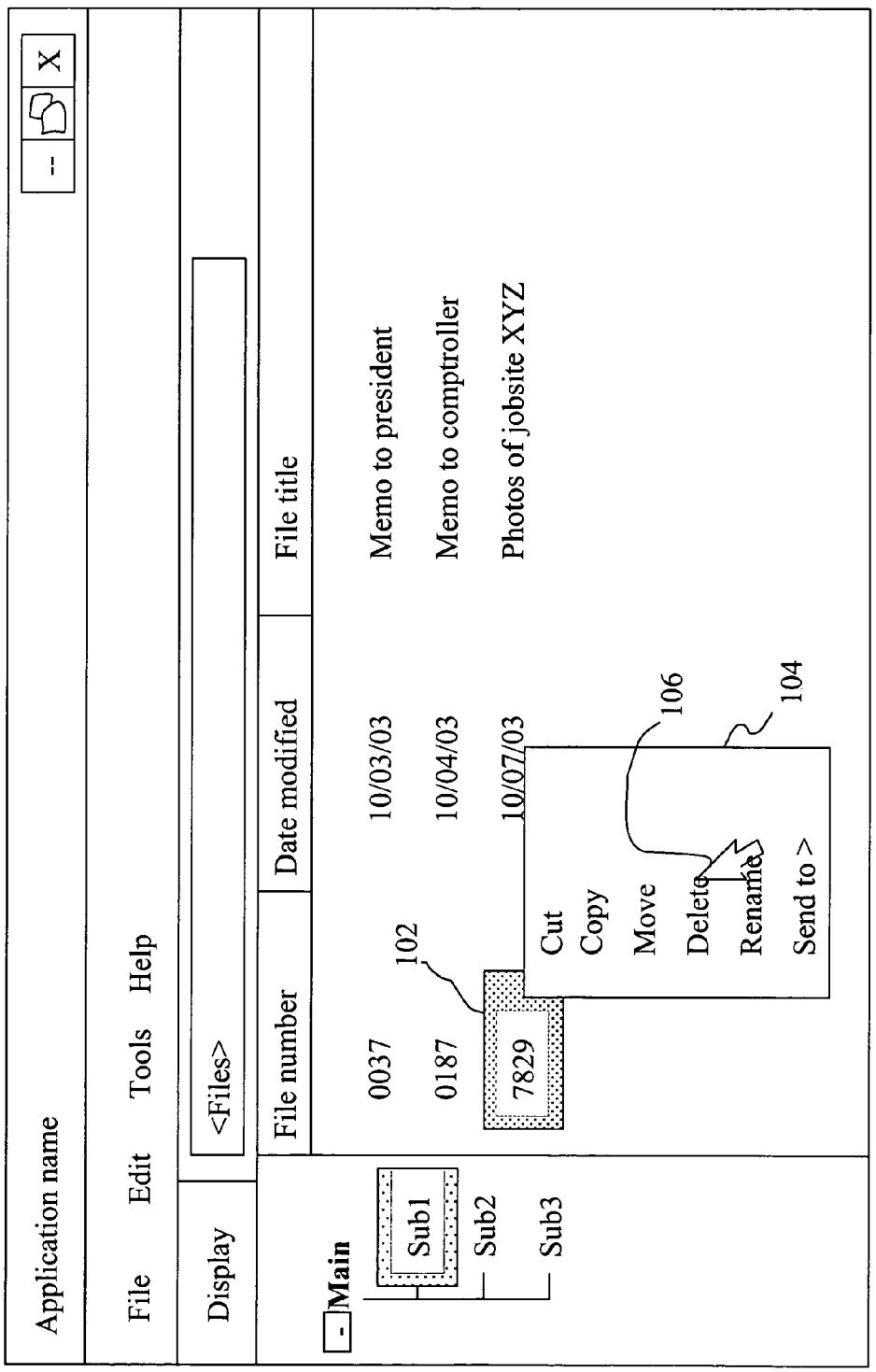
FIG. 1 depicts a prior art graphical user interface (GUI) for selecting a file or files, and then applying an operation to the selected file(s)
Figure 2:
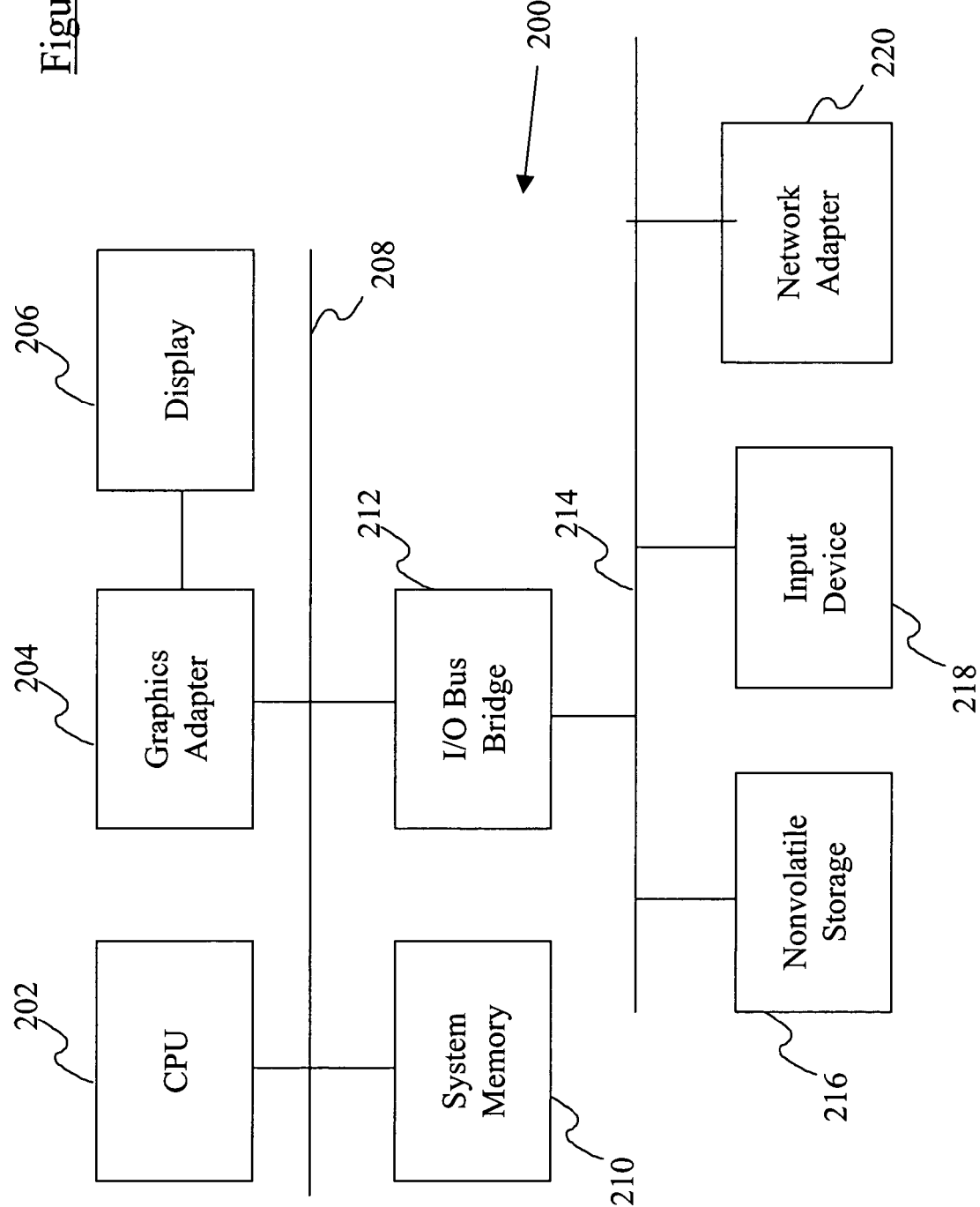
FIG. 2 illustrates a preferred embodiment of a data processing system incorporating the features of the present invention.

With reference now to FIG. 2, there is depicted a block diagram of a data processing system in which a preferred embodiment of the present invention may be implemented. Data processing system 200 may be, for example, one of the models of personal or server computers available from International Business Machines Corporation of Armonk, N.Y. Data processing system 200 includes a central processing unit (CPU) 202, which is connected to a system bus 208. In the exemplary embodiment, data processing system 200 includes a graphics adapter 204 also connected to system bus 208, for providing user interface information to a display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, and input device 218, which may include a conventional mouse, a trackball, or the like, is connected to I/O bus 214. Also connected to I/O bus 214 is a network adapter 220 for connection to a network (not shown).

The exemplary embodiment shown in FIG. 2 is provided solely for the purposes of explaining the invention and those skilled in the art will recognize that numerous variations are possible, both in form and function. For instance, data processing system 200 might also include a compact disk read-only memory (CD-ROM) or digital video disk (DVD) drive, a sound card and audio speakers, and numerous other optional components. All such variations are believed to be within the spirit and scope of the present invention.

Figure 3:
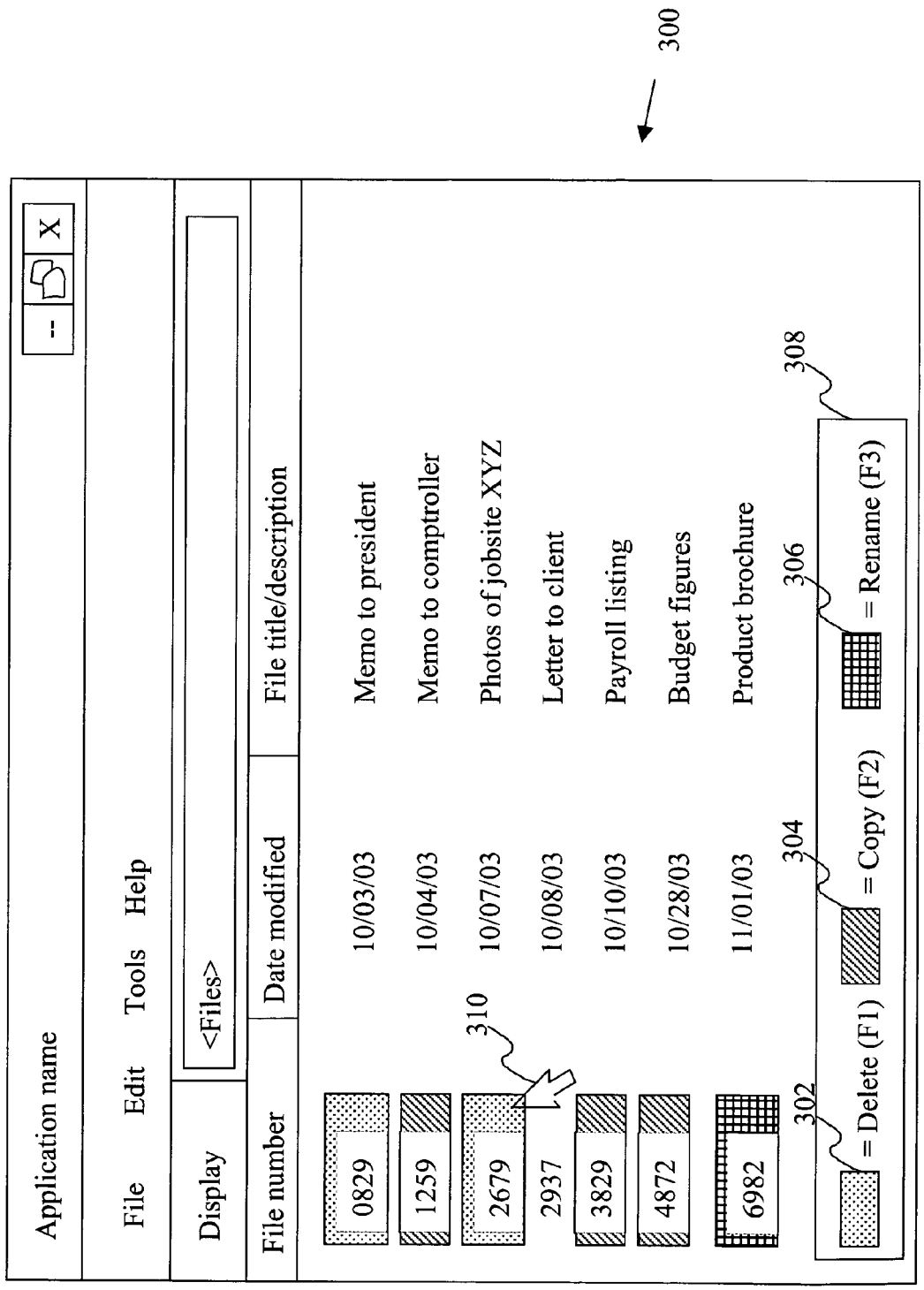
FIG. 3 depicts a preferred GUI using the present invention, in which multiple operations are chosen for multiple files, each operation being capable of being applied to multiple files.

With reference now to FIG. 3, there is illustrated a graphical user interface 300 incorporating preferred features of the present invention. In FIG. 3, seven file numbers are depicted, along with each file's last date modified and title/description. Assume that the user wishes to delete files 0829 and 2679. To perform this operation, the user first holds down a pre-defined set of keys, such as "Control" plus "F1." While holding down these two keys at the same time, a user then uses a mouse (not shown) or similar input device to position a cursor pointer 310 over the focus area for file 0829 and then 2679 (as shown), and then the user left clicks the mouse. Doing so will highlight the focus area around the selected files with a first distinct visual feature 302, such as the depicted geometric pattern, or preferably a color, such as the color red.

Next, while simultaneously holding down the "Control" and "F2" keys, the user highlights files 1259, 3829 and 4872, indicating that these files are to be copied, and a second distinct visual feature 304, such as the color green, is applied to the file display. Finally, while simultaneously holding down the "Control" and "F3" keys, the user highlights file 6982, indicating that this file is to be renamed, and a third distinct visual feature 306, such as the color blue, is applied to the file display. Note that file 2937 has not been highlighted, and thus no operation will be performed on file 2937. In one embodiment, a pop-up window 308 appears to give the user an on-screen guide to what the colors mean and how to select the operations.

At this stage, the user is able to look at all of the files, and decide if the chosen actions are correct. If not, then a "cancel" function can be invoked by depressing one or more keys, such as the "Control" and "F4" keys, and clicking on the file whose operation is to be revoked. If so desired, a new operation may be selected for that file, as described above, or the file may remain free of any applied file management operation, such as file 2937 in the illustration.

In a preferred embodiment, the distinct visual features depicted as 302, 304 and 306, are actually active icons, such that the operation is selected by "clicking" on the active area where the icon is displayed. All files subsequently selected after clicking one of the active icons will have the associated operation applied to that file. The process of applying operations to files ends when the "Enter" key is engaged, causing all selected operations to execute. Thus, the input to select an operation may be a key on keyboard, a selection of an active icon on a GUI, or any other similar type of input or input device known to those skilled in the art of computers.

In another preferred embodiment, multiple operations may be applied to a same file. For example, file 1259 may be both copied and then deleted. To do so, the user would go back to the focus area around the file display for file 1259, and click the area while holding down the "Control" and "F1" keys. A hierarchy determining the order or the operations is pre-determined. In this case, file 1259 would obviously be copied before it is deleted. To indicate that two operations are to be performed on the file, the highlighted area around the file number display will contain a combination of both colors for the two operations, such as one half being red (for delete) and one half being green (for copy).

When the user has determined that the proper operations have been selected for each file, the operations are executed by entering another key, such as the "Enter" key. All selected operations, as reflected by the highlighting colors, are then performed.

Figure 4:
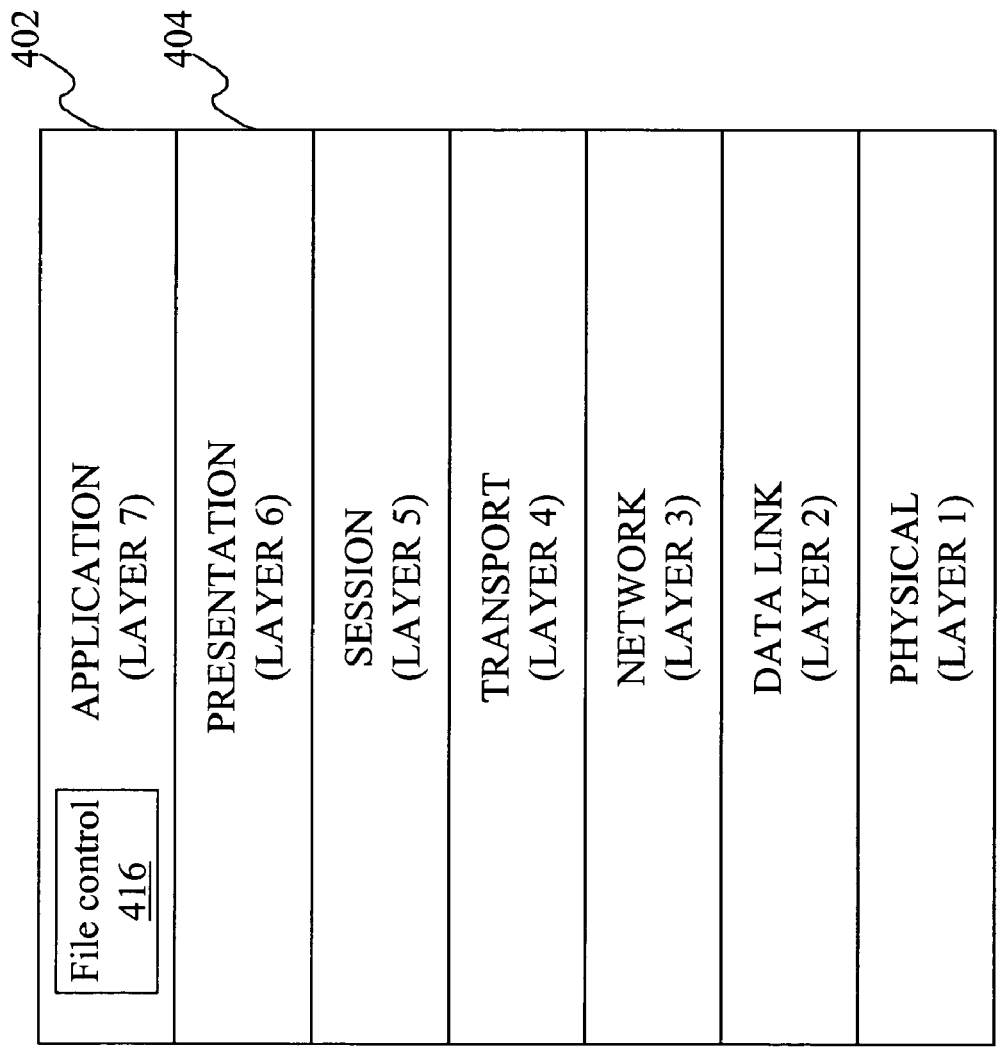
FIG. 4 illustrates a preferred location in software layers for file control software to implement the present invention.

With reference now to FIG. 4, there are depicted the seven layers of the Open System Interconnection (OSI) model 400, as described by OSI 7598 and its various addenda, published by the International Standards Organization (ISO) and incorporated herein by reference in its entirety.

Application layer 7 (402) supports application and end-user processes. This layer directly represents the services that directly support user applications, handles network access, flow control, error recovery, etc. Preferably, it is within this layer that a file control 416 resides. File control 416 contains software instructions that direct the highlighting and application of operations to files as described above.

Alternatively, file control 416 may reside in the presentation layer 6 (404), which is responsible for protocol conversion, character conversion, expanded graphics commands and sets standards for different systems to provide communication from multiple protocol stacks. By placing file control 416 in the presentation layer 6, the operations described are less likely to be tied to a particular application.

Figure 5:
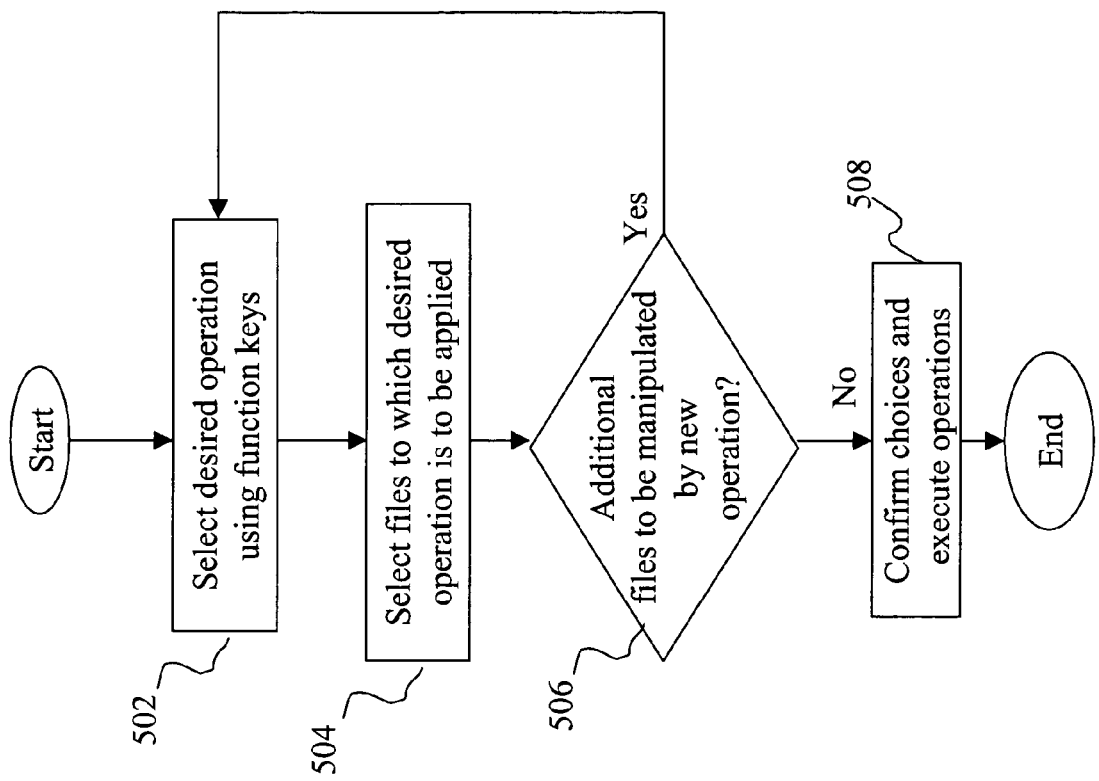
FIG. 5 is a high-level flow-chart of process steps taken in the present invention for implementing operations on different files displayed on the GUI depicted in FIG. 3.

With reference now to FIG. 5, there is a flow-chart of steps taken in a preferred embodiment of the present invention. Starting at step 502, the user selects the desired first operation by depressing one or more keys, as described above. Files are selected (step 504) by left clicking on the focus area around the file displays. A decision (step 506) is then made to determine if other operations are to be applied to new files or to files already chosen for another operation. If so, then these operations are selected for the chosen files. When all files have had the chosen operations selected, the user confirms her choices and then executes the operations (step 508), by pressing the "Enter" key or performing some other pre-determined operation.

Figure 6:
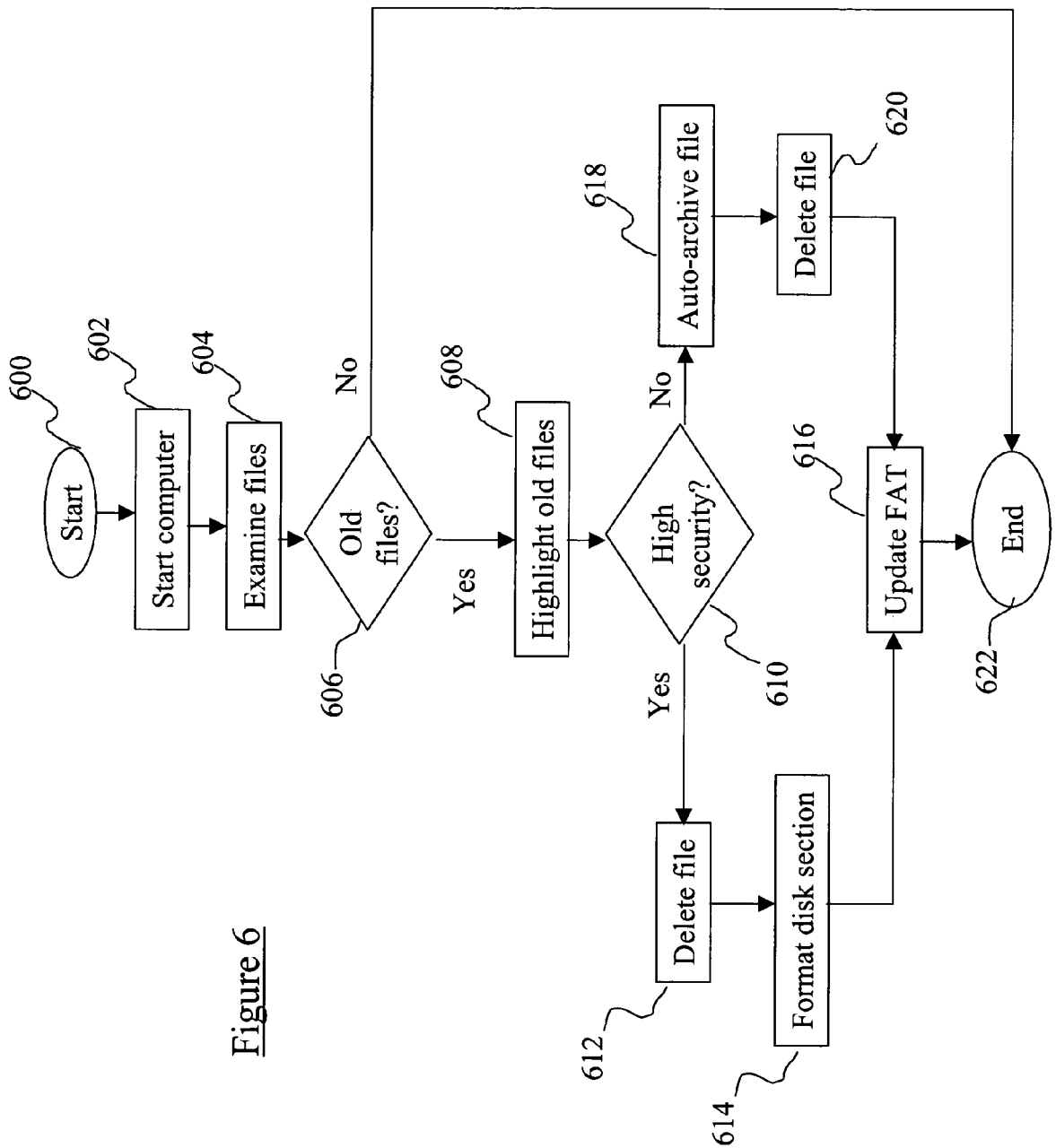
FIG. 6 is a flow-chart of steps taken to color code files according to age and security level.

With reference now to FIG. 6, there is depicted a flow-chart describing a preferred embodiment of the present invention that includes features for managing old and/or sensitive files. Starting at initiator block 600, the computer is booted up (block 602), and then files are examined (block 604) for their age and the level of sensitivity. If any files are old (query block 606), that is if they were either edited or created after a pre-determined period of time, then the old files are highlighted with a designating color, such as amber. The color designation may be automatic, according to pre-defined criteria and executed by pre-loaded software, or the color designation may be manually applied to the file by the user by clicking the file while concurrently holding a specially designated key or the like. The identified old files are then examined (query block 608) to determine their security (sensitivity) level. If the file is determined to be a "high security" file that should not remain indefinitely on the computer, then it is deleted (block 612).

As those skilled in the art know, when a file is "deleted," most programs generally only remove the file allocation table (FAT) entry in the FAT for the deleted file, while the actual file data physically remains on the disk. To "wipe" the file completely off the disk, then, the section of the disk where the file is stored is re-formatted (block 614), using multiple overwrites of the disk area with opposing bit patterns, such as writing all "1's" followed by writing all "0's" on the file's disk area. The FAT is then updated to reflect the erased file (block 616), and the process ends (terminator 622).

If it was determined at query block 610 that the old file was not a security risk, then the old file is auto-archived (block 618) before being deleted (block 620). By automatically archiving the file to an archive storage area (not shown), the deleted file can later be retrieved if a user changes her mind about deleting the file. Such an auto-archive system is preferably independent of a "trash" or "recycle bin" section of memory, so that file must be manually deleted out of the auto-archive file area.

In an alternative embodiment of the process depicted in FIG. 6, the user could be prompted with color coding of displayed files that shows all sensitive high security files (by jumping from block 604 to block 610 and highlighting the sensitive files. By viewing these sensitive files, the user is reminded that her computer contains files that pose a security risk, and is thus prompted to remove such files from the computer's storage before the computer is thrown away, donated to charity, or moved to another department or user that does not have the same security clearance as the original user of the computer.

Note that the present invention is independent of the running application, the user's native language, or the operating system. That is, by knowing that a combination of keys such as "Control" and "F3" will set up a file to be renamed, then the user knows that any file that is color-coded "blue" will be renamed when the "Enter" key is pressed. This is especially helpful when the user is not even familiar with the characters of a foreign language. For example, assume that file 0829 has a title that is in Russian, using the Cyrillic alphabet. If the user knows what the file is about, she can rename it in her own language, without trying to use a drop-down menu that is also likely in a foreign language that the user does not understand.

In a preferred embodiment, different windows may be focused while retaining the selections of the previous window. That is, assume that after highlighting the files shown in GUI 300 of FIG. 3, the user goes to another window (not shown). The user can highlight selected files on the other window and then return to the first window shown in FIG. 3, toggling back and forth between the active and inactive windows to view the highlighted files in both windows until the user is certain that the proper operations have been selected for each file. When certain that the proper operations have been selected, pushing the "Enter" key will cause all operations to be executed for all files, no matter which window is active.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for applying a set of operations for execution on a corresponding file displayed on a graphical user interface, such that the set includes a plurality of different operations, the method comprising:

associating a different operation with each of a plurality of active icon inputs;

associating a distinct visual display feature with each of the plurality of active icon inputs for each of the different operations;

selecting a first active icon input to apply a first operation to be executed on a displayed file;

selecting a file display for the displayed file on a graphical user interface (GUI) to associate the selected first active icon input with the displayed file;

presenting a first distinct visual feature associated with the first operation in a first portion of the file display of the displayed file;

selecting a second active icon input to apply a second operation to be executed on the displayed file;

reselecting the file display for the displayed file to associate the selected second active icon input with the displayed file; and presenting a second distinct visual feature associated with the second operation in a second portion of the reselected file display of the displayed file such that the first distinct visual feature is also being presented.

2. The method of claim 1, further comprising:

subsequently executing the first and second operations on the displayed file, after the first and second distinct visual features are respectively displayed on the first and second portions of the file display of the displayed file and the first and second operations are confirmed for execution on the displayed file.

3. The method of claim 1, wherein the distinct visual features are color-coded.

4. The method of claim 1, wherein the distinct visual features are geometric patterns.

5. The method of claim 1, wherein the plurality of active icon inputs are selected by using an input device to click on active icons which are displayed on the GUI.

6. A computer system for applying a set of operations for execution on a corresponding file displayed on a graphical user interface, such that the set includes a plurality of different operations, the system comprising:

a monitor for displaying a file display for a displayed file in a graphical user interface (GUI);

a plurality of active icon inputs, each input being associated with a different operation to be applied to the displayed file, each different operation being associated with a distinct visual display applied to the file display for the displayed file; and an input device for selecting the file display for the displayed file in the GUI in a first instance after engaging a first active icon input and reselecting the file display for the displayed file in a second subsequent instance after engaging a second active icon input from the plurality of active icon inputs, wherein a first operation to be applied for execution on the displayed file is associated with the first a icon input and a second operation to be applied for execution on the displayed file is associated with the second active icon input, wherein a first portion of the file display of the displayed file presents a first distinct visual feature associated with the first operation, and wherein a second portion of the file display of the displayed file presents a second distinct visual feature associated with the second operation, and wherein a pre-determined hierarchy between the first operation and the second operation determines whether the first operation or the second operation will first be executed on the displayed file.

7. The computer system of claim 6, further comprising:

an execution unit for executing the first and second operations on the displayed file according to a pre-determined hierarchy of execution for the first and second operations.

8. The computer system of claim 6, wherein the distinct visual features are color-coded.

9. The computer system of claim 6, wherein the distinct visual features are geometric patterns.

10. The computer system of claim 6, wherein the plurality of inputs are selected icons on a graphical user interface (GUI).

11. The computer system of claim 6, wherein the displayed file is a sensitive file selected for deletion.

12. The computer system of claim 11, wherein the sensitive file is erased from a hard disk on a computer by pre-formatting only areas on the hard disk that had stored the sensitive file via multiple overwrites of those disk areas using opposing bit patterns.

13. A computer program product, residing on a computer storage medium, for applying a set of operations for execution on a corresponding file displayed on a graphical user interface, such that the set includes a plurality of different operations, the computer program product comprising:

computer program code for associating a different operation with each of a plurality of active icon inputs;

computer program code for associating a distinct visual display feature with each of the plurality of active icon inputs for each of the plurality of operations;

computer program code for selecting a first active icon input to apply a first operation for execution on a displayed file;

computer program code for selecting a file display for the displayed file on a graphical user interface (GUI) to associate the selected first active icon input with the displayed file;

computer program code for presenting a first distinct visual feature associated with the first operation in a first portion of the file display of the displayed file;

computer program code for selecting a second active icon input to apply a second operation for execution on the displayed file;

computer code for reselecting the file display for the displayed file to associate the selected second active icon input with the displayed file; and computer program code for presenting a second distinct visual feature associated with the second operation in a second portion of the reselected file display of the displayed file such that the first distinct visual feature is also being presented.

14. The computer program product of claim 13, further comprising:

computer program code for executing the first and second operations on the displayed file according to a pre-determined hierarchy of execution as between the first and second operations.

15. The computer program product of claim 13, wherein the distinct visual features are color-coded.

16. The computer program product of claim 13, wherein the distinct visual features are geometric patterns.

17. The computer program product of claim 13, wherein the displayed file is a sensitive file selected for deletion.

18. The computer program product of claim 13, wherein the plurality of active icon inputs are selected by using an input device to click on active icons which are displayed on the GUI.

* * * * *

UNITED STATES PATENT AND TRADEMARK OFFICE
CERTIFICATE OF CORRECTION

PATENT NO. : 7,614,007 B2 Page 1 of 1
APPLICATION NO. : 10/759932
DATED : November 3, 2009
INVENTOR(S) : Chakravarty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this

Fourteenth Day of December, 2010

David J. Kappos
*Director of the United States Patent and Trademark Office*